J. T. MacCURDY.
PHOTOGRAPHIC EXPOSURE METER.
APPLICATION FILED JUNE 20, 1916.
1,241,133.
Patented Sept. 25, 1917.
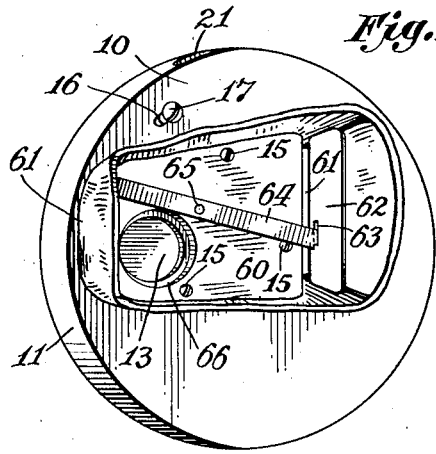
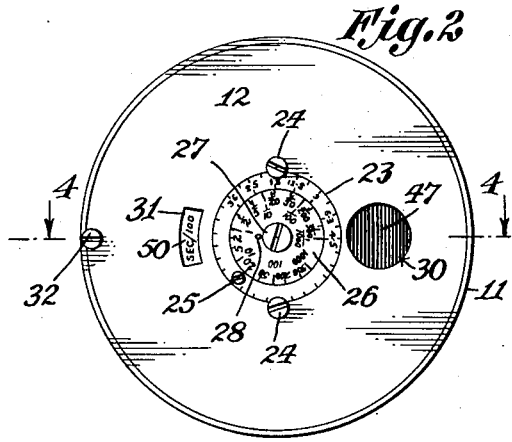
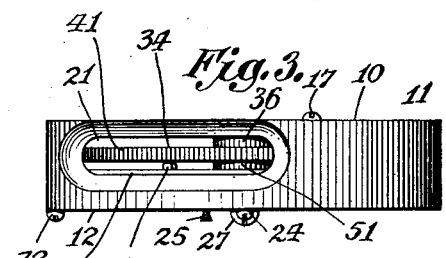
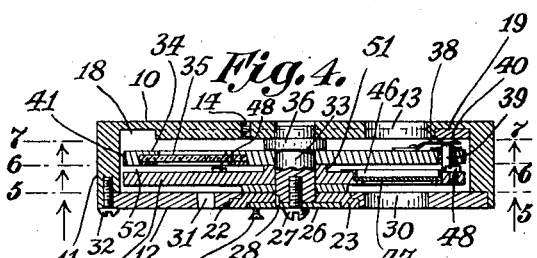
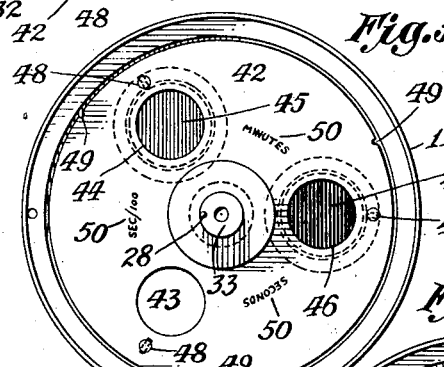
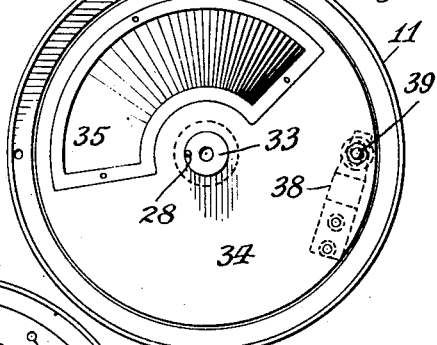
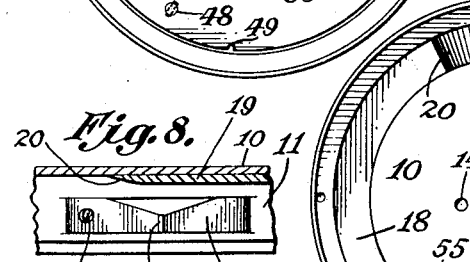
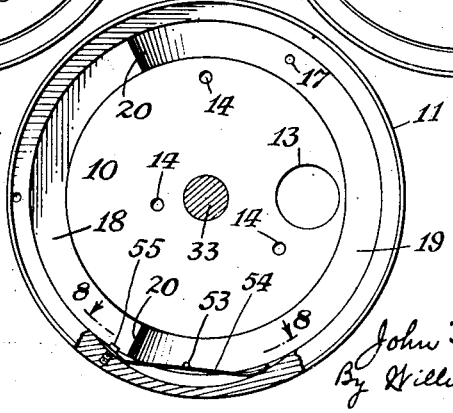
Attest:
Inventor:
John T. MacCurdy
By William R. Baird
his Atty

UNITED STATES PATENT OFFICE.

JOHN T. MacCURDY, OF NEW YORK, N. Y.

PHOTOGRAPHIC EXPOSURE-METER.

1,241,133.  Specification of Letters Patent.  Patented Sept. 25, 1917.

Application filed June 20, 1916.  Serial No. 104,687..

*To all whom it may concern:*

Be it known that I, JOHN T. MACCURDY, a subject of the King of Great Britain, residing at New York, in the county of New York and State of New York, have invented certain new and useful Improvements in Photographic Exposure-Meters, of which the following is a specification.

This invention relates to photographic exposure meters, and its novelty consists in the construction and adaptation of the parts, as will be more fully hereinafter pointed out.

The object of the invention is to provide an instrument designed to be held in the hand and immediately before the eye of the observer in order to enable him to examine by direct vision any object which he desires to photograph, and by the manual manipulation of the parts, to bring the object viewed to a standard of apparent brightness, the instrument being provided with scales from which may be directly read after such manipulation, the correct time of exposure for any given camera stop.

In the preferred form of the invention, which is herein described and illustrated, and in which it has been reduced to practice, there is shown a casing containing a movable, preferably circularly rotatable photographic wedge, and automatically operated auxiliary screens by means of which the object viewed through the instrument may be reduced in apparent brightness to any extent or to the point of visual extinction. A scale is attached to and movable with the wedge and adjacent thereto is arranged a fixed scale, the scales being so graduated that the correct time exposure for the object viewed for any given aperture or stop of the camera may be directly read from the scales after manipulation. There is also provided means adapted to adjust the fixed scale whereby its readings may be caused to correspond to plates of a specified degree of sensitiveness and for light of a specified actinic quality or to correspond to any individual peculiarity of the observer's power of vision. It is also provided with an eye shield for excluding extraneous light during observation, and if desired, with colored screens, thus permitting the making of observations with light of a color adapted to the spectral sensitivity of photographic plates of various sorts.

In the drawings, Figure 1 is a perspective of the preferred form of the device; looking at it from the rear; Fig. 2 is a front elevation of the device; Fig. 3 is a top plan view but omitting the eye shield; Fig. 4 is a transverse section on the plane of the line 4—4 in Fig. 2; Figs. 5, 6 and 7 are sections on the planes of the respective lines 5—5, 6—6 and 7—7 in Fig. 4; Fig. 8 is a detail of the screen carrier detent; and Fig. 9 is a detail of the wedge carrier pin spring.

The parts are shown inclosed in a casing of suitable size and material comprising a rear plate 10, a continuous flange 11 projecting therefrom, and made integral therewith or secured thereto, and a front plate or cover 12 fitting snugly against the flange 11, making in effect a cylindrical drum closed at both ends.

The rear plate 10 is provided with a central aperture adapted to receive and serve as a bearing for the shaft 33 presently to be described. It is also provided with an observing aperture 13 suitably located and with means whereby there may be attached to the plate a collapsible eye shield, the particular means in the form illustrated consisting of holes 14 adapted to receive screws 15 by which the eye shield is held in position. A slot 16 is provided in the plate to receive a screw 17. At its front face, the plate 10 is provided with an annular recess 18 adapted to receive an arcuate plate 19 having terminal beveled surfaces 20 at each end, these surfaces serving as cams as hereinafter described. The plate 19 is adjustably secured to the plate 10 by the screw 17. The flange 11 is provided with a peripheral slot indicated at 21.

The front plate or cover 12 is provided with a central aperture around which is arranged a bearing surface 22 adapted to support a circular disk 23 provided with a peripheral notation constituting a scale corresponding to different camera stops or apertures. This scale disk 23 is adjustably secured in place and maintained therein after such adjustment by any suitable means, as screws 24, threaded into corresponding apertures in the plate 12. A pin 25 projecting from the front face of the disk 23 serves as a means for moving it circularly. The disk 23 is recessed and adapted to receive a rotatable disk 26 graduated in terms of elapsed time on its front surface and provided with a central aperture adapted to receive a screw 27 threaded into one end of the wedge carrier shaft 33 which rotates in an aperture in the disk 23 as a bearing. An eccentric aperture in this disk 26 is adapted to receive a dowel pin 28 projecting longitudinally from said shaft, whereby the disk 26 and shaft 33 are coupled together and rotate in unison. The plate 12 is also provided with an objective aperture 30 and an observing slot 31 and with means whereby it is secured to the flange 11, for instance the screw 32 threaded into the flange.

The shaft 33 is coincident in position with the longitudinal axis of the cylindrical casing. Secured to the shaft and adapted to rotate with it is a disk 34 provided with an arcuate aperture into which is fitted a photometric wedge 35 continually varying in its degree of transparency from one end to the other in such a manner that its equal angular intervals correspond to equal percentages of light transmitting power, so that the angular interval is a logarithmic function of such power. The disk 34 is in effect a photometric wedge carrier. The photometric wedge itself may be made of any suitable material, as glass or celluloid or other film material, and of any color desired. The varying transparency of the wedge may also be produced in any suitable manner by photographic or mechanical means. A spacing hub 36 formed on the shaft 33 keeps the disk 34 at such a distance from the front of the rear plate 10 as to preserve a space between them. Near the edge of the disk 34 there is secured a leaf spring 38, bent out of the plane of the disk, and which loosely carries a pin 39 adapted to project transversely through a hole in the disk 34, and which pin is provided with a flat head 40 adapted to contact with and slide over the beveled surfaces 20 of the arcuate plate 19. The periphery of the disk 34 is milled as indicated at 41 in order to permit it the more readily to be manipulated by the finger of the operator.

Loosely mounted on the shaft 33 is a disk 42 having a series of apertures (three in number in the present instance) spaced apart at equal angles. One aperture 43 is clear, that is, it either has no screen or is provided with a screen of transparent material. A second aperture 44 has a screen 45 of small light transmitting power, and a third aperture 46 has a screen 47 of yet smaller light transmitting power. These are observation screens and are intended to be used in connection with the photometric wedge in order to increase its range of use. The disk 42, which may appropriately be called an observation screen carrier, is provided on its rear face (one opposite each screen) with lugs 48. It is provided on its edge with notches 49 and on its opposite face with time legends indicated at 50. A spacing hub 51 formed on the disk 42 keeps the disk away from the wedge carrier so as to preserve a space 52 between them.

Inside the flange 11 at a suitable place there is arranged an elastic detent 53, mounted on the inner surface of the flange by means of a screw 55 and normally pressed inwardly to contact with the notches 49 and adapted to be moved when out of such contact into a recess formed in the flange.

The wedge and screens are placed in suitable recesses in their respective carrier plates and are held in position by retaining frames so that they may be removed and replaced readily.

The eye shield used in connection with the described apparatus comprises a base plate 60 secured by any suitable means, as the screws 15, to the rear face of the plate 10, and to which base plate there is secured by hinges indicated at 61, two wings 62, 62, each provided with straight-sided slots indicated at 63 and which slots are adapted to be engaged by the notched ends of an oscillatable bar 64 secured to the bottom plate 60 by a pivot indicated at 65. When the bar is in the position shown in Fig. 1 of the drawing, its extremities engage the wings and keep them distended and in an outwardly flaring position with respect to the base 60. When the bar is swung so that such engagement no longer takes place, the wings can be folded down against this base plate. The entire device is provided with a cover of leather or other suitable opaque material which may or may not be reinforced with a framework. An aperture in the base indicated at 66 coincides with the observation aperture 13 of the casing.

When the instrument is to be used for the described purpose, the wedge and screen carriers are assembled with respect to the central shaft of the device and the spacing devices as indicated in Figs. 3 and 4. It will be assumed that the clear aperture 43 of the screen carrier is in registry with the observation aperture 13 and the objective aperture 30 and that the most transparent part of the wedge has been brought also in registry with these two apertures. When the parts are in this position, the detent 53 will be in engagement with one of the notches 49 on the edge of the screen carrier and will hold the latter against rotation. The pin 39 on the wedge carrier will be pressed by its spring into contact with the bottom of the groove 18. It is obvious that the rotation of the wedge carrier, which is accomplished by a manipulation by the observer of the milled edge of the disk of this carrier through the slot in the flange 11 provided for that purpose, will bring the head 40 of the pin 39 into contact with the beveled surface 20 of the plate 19, which beveled surface, acting as a cam, will cause the pin 39 to project through its aperture in the wedge carrier disk until the head reaches the flat surface of the plate 19. Thereafter and while it is maintained in contact with such surface, the pin will project through the aperture in the wedge carrier into the plane of the lugs 48 on the screen carrier 42, so that if the rotation of the wedge carrier is continued, the pin will after a time contact with one of these lugs and cause the screen carrier to be moved, such movement continuing until the head 40 of the pin 39 reaches the second beveled surface 20 of the plate 19 and the head 40 is then forced, under the action of its spring 38, to contact again with the lower surface of the groove 18 and to move out of engagement with the lug with which it has been in contact up to that time. Obviously the further rotation of the wedge carrier will have no effect upon the screen carrier so long as the pin 39 is moving along the bottom of the groove 18 but when in its rotation it again meets the cam surface of the plate 19, the pin will project through the wedge carrier disk as before and contacting with another one of the lugs 48, will again move the screen carrier through an arc determined by the length of the plate 19. In other words, the continued rotation of the wedge carrier causes an intermittent movement of the screen carrier, and the function accomplished by this relation of the parts is as follows: The initial movement of the wedge carrier past the observation and objective apertures, is such that the wedge is gradually moved past these apertures so that its progressively darkened portion is brought successively between them; that is, an object viewed through these apertures and the wedge becomes progressively obscured until its illumination or visibility reaches any desired standard. If, however, its visibility has not been reduced to a desired point when the darkest end of the wedge has been brought opposite the observation aperture, the rotation of the wedge carrier is continued and this causes a rotation of the screen carrier, bringing to registry with the observation and objective apertures the less opaque of the observation screens and causing, by the intermittency of the movement referred to, such screen to remain in that position while the wedge is being moved past it. The opacity of the second screen is intended to be approximately equivalent to the opacity of the darkest edge of the wedge, so that as the wedge is moved past this screen, the field of vision is again progressively darkened. In the manner above described, as soon as the wedge has been moved past the observation aperture, the movement of the pin 39 will cause the third or most opaque of the screens to be brought to registry opposite the observation aperture, this screen being of an opacity approximately equal to that of the first screen plus that of the darkest edge of the wedge, and the movement of the wedge being continued the visibility of the object viewed through the instrument is gradually reduced as before.

The purpose of the detent 53 is to hold the screen carrier in position so that the different screens carried thereby will remain in registry with the observation and objective apertures of the instrument, while the photometric wedge is being moved past such apertures, the engagement of the detent with the several notches 49 being sufficient for that purpose, but insufficient to prevent the rotation of the screen carrier against the force of ordinary manual manipulation due to the pressure of the observer's finger upon the milled edge 34 of the wedge carrier.

It will be understood that functionally the purpose of the observation screens of different degrees of opacity is to prolong the capacity of the wedge over a larger extent of movement than the wedge in its simplest form would permit.

The ring 23 constitutes a scale graduated logarithmically with divisions bearing the designations of the various camera stops or diaphragms (such as $f/8$, $f/11.3$, $f/16$, or the designations on any other definite system) and placed at such intervals that their positions correspond on the same basis as that used in graduating the rotatable scale 26, to the exposure times necessary to secure correctly exposed photographs of the same objects with the various stops. This scale ring, as previously explained, is adjustable and may be secured in position at any desired place after such adjustment. The rotatable disk 26, which is rigidly attached to the shaft 33 and consequently to the wedge carrier, displays a circularly arranged scale graduated logarithmically in such a manner that its readings are directly proportional to the exposed time requisite to obtain a correctly exposed picture of an object of such brightness that it is just reduced to invisibility or to any other standard of apparent brightness when the wedge is at a corresponding position. It will be understood that this exposure time is not merely inversely proportional to the intensity of the light falling on the photographic plate, but is inversely proportional to some power of the intensity of such light, the exponent of which is usually not far from 1.3. On account of the logarithmic nature of the graduation, it may be so constructed as to correspond to any specified value of such exponent.

If the instrument is directed at any object for which the correct exposure time with a given camera stop is known, and the wedge carrier is turned until this object is brought to the standard of visibility desired, and if the scale ring 23 is then turned so that the graduation on it corresponding to the given camera stop is opposite the graduation on the rotating scale 26 corresponding to the correct exposure time for this stop, then the readings on the latter scale opposite all of the other camera stop notations marked on the edge of the ring 23, will give the correct exposures for the same object and such other camera stops, and if the instrument is directed toward any other object and the wedge carrier rotated until this is brought to the chosen standard of visibility, the correct exposure on this latter object for any camera stop may be read on the rotating scale opposite the graduation corresponding to that stop on the scale ring 23.

The power of transmission of the screen 45 is so adjusted as to correspond to an exposure ratio of 60 and of the screen 47 to a ratio of 6000. If then an object just extinguished or brought to a chosen standard of visibility with a given setting of the wedge and the clear opening 43 in place, requires an exposure of a given number of minutes, an object which is just extinguished or brought to the same standard of visibility at the same setting of the wedge but with the screen 45 in place will require an exposure of this same given number of seconds, and one just extinguished or brought to the same standard of visibility at the same setting of the wedge with the screen 47 in place, will require an exposure of this given number of hundredths of a second. The rotatable scale therefore reads the exposure time in minutes, seconds or hundredths of a second, depending upon whether the screen 43, 45 or 47 is in position between the observation and objective apertures. The legends "Minutes", "Seconds" $\frac{\text{"Seconds"}}{100}$ or other appropriate time notations are inscribed on the face of the screen carrier so that they are each visible through the aperture 50 provided for their perception when the corresponding screen is in position. The operator is therefore enabled to directly read in terms of the proper notation the proper exposure time after the instrument has been manipulated.

To allow for the different sensitiveness of different sorts of photographic plates, the outer edge of the ring scale 23 is graduated with suitably placed and numbered divisions, and a fiducial mark is placed at an appropriate place on the surrounding casing opposite these. The reading of this mark on the scale which gives a correct exposure setting for plates of any particular brand, may be determined once for all and the results for various plates and for various kinds of artificial light, in addition to daylight, may be tabulated and displayed on the outer face of the casing of the instrument or furnished to accompany the same. It will be understood that such fiducial mark should be placed in a position corresponding to the sensitiveness of a normal eye. If owing to peculiarities of any particular observer or of the lens of a particular camera, such position of the mark is inappropriate for a particular person or particular camera, a correct fiducial mark for such person or camera may be determined by ascertaining the correct exposure time on a given object by trial and then adjusting the ring scale 23 and making a new mark opposite the standard reading on the rotatable scale which corresponds to the brand of plates employed. Disks of a colored material may be placed in front of the objective aperture. The spectral transmission of such disks may be so chosen that the spectral luminosity curve of the eye for observation through such a disk is similar to that of a photographic plate of a given kind. For example, a suitable blue screen will give visual luminosity ratios for the different colors approximating those given by an ordinary photographic plate. Such colored disks may be removable and interchangeable. It will also be understood that the photometric wedge and the different screens used in connection therewith and auxiliary thereto may be made of suitable spectral transmission for any special kind of illumination or for photographing through special color filters.

The collapsible eye shield which is attached to the instrument is designed to exclude from the eye of the observer all extraneous light and its collapsibility is provided merely as a convenience in reducing the bulk of the instrument for transportation.

I claim:

1. A photographic time exposure meter, comprising a photometric wedge, means for moving the same past a field of vision, a relatively fixed scale of camera stops, and a scale of exposure times movable with the wedge, whereby after movement of the wedge until a desired standard of visibility is arrived at for an object within the field of vision, the proper exposure time for any camera stop may be read directly from the movable scale.

2. A photographic time exposure meter, comprising a photometric wedge, with its power of transmitting light varied according to a logarithmic law, a relatively fixed scale of camera stops, and a scale of exposure times adapted to be moved in harmony with the movement of the photometric wedge.

3. A photographic time exposure meter, comprising a photometric wedge with its power of transmitting light varied according to a logarithmic law, a relatively fixed scale of camera stops, and a scale of exposure times, both scales being graduated logarithmically and the scale of times being adapted to be moved from the photometric wedge.

4. An exposure meter comprising a casing, having suitable apertures constituting a field of vision, a photometric wedge, and means for moving the same past the field of vision, a relatively fixed scale graduated in terms of camera stops supported by the casing, and a scale graduated in terms of exposure times adapted to be moved in unison with the movement of the photometric wedge whereby the time for properly exposing an object within the field of vision when it is in front of a camera having the proper stop may be read directly from the movable scale.

5. An exposure meter comprising a casing having suitable apertures constituting a field of vision, a photometric wedge and means for moving the same past the field of vision, a relatively fixed scale graduated in terms of camera stops supported by the casing, and a scale graduated in terms of exposure times adapted to be moved in unison with the movement of the photometric wedge, in combination with means for prolonging the range of the photometric wedge.

6. An exposure meter comprising a casing having suitable apertures constituting a field of vision, a photometric wedge and means for moving the same past the field of vision, a relatively fixed scale graduated in terms of camera stops supported by the casing, and a scale graduated in terms of exposure times adapted to be moved in unison with the movement of the photometric wedge, in combination with means for prolonging the range of the photometric wedge including screens of predetermined light transmitting power and means for moving them within the field of vision.

7. In an instrument of the kind described, a photometric wedge, in combination with means for moving it past a field of vision, the wedge having a progressively varying light transmitting power, and means for prolonging its range without altering its dimensions, including a plurality of screens, the light transmitting power of each screen in the series being equal to that of the darkest part of the wedge plus that of the preceding screen.

8. A photographic time exposure meter comprising a photometric wedge and means for moving the same, a relatively fixed scale of camera stops and a scale of exposure times movable with the wedge, in combination with means for adjusting the relatively fixed scale.

9. A photographic time exposure meter comprising a photometric wedge, means for moving the same, a scale of camera stops relatively fixed in position, and a scale of exposure times movable with the wedge, in combination with means for moving the camera stop scale to a new position and fixing it therein.

10. A photometric time exposure meter comprising a photometric wedge, means for moving the same past a field of vision, a relatively fixed scale of camera stops, and a movable scale of exposure times moving in unison with the wedge, in combination with means for varying the color of the field of vision.

11. In an instrument of the character described, a rotatable carrier, an arcuate photometric wedge carried thereby and rotated therewith, a relatively fixed scale of camera stops, and a scale of exposure times moved with or by the carrier.

12. In an instrument of the character described, a rotatable carrier, an arcuate photometric wedge carried thereby and rotated therewith, a casing within which the carrier is supported, an external scale on the casing graduated in terms of camera stops, and a second external scale adjacent thereto graduated in terms of exposure times, the latter scale being moved with or by the carrier.

13. In combination, a casing, a rotatable carrier supported and adapted to move therein, a photometric wedge carried thereby and rotated therewith, a removable and adjustable but relatively fixed external scale on the casing graduated in terms of camera stops, and a second scale moved by the carrier adjacent to the first scale and graduated in terms of exposure times.

14. In an instrument of the character described, a photometric wedge varying in light transmitting power from one part to the other, a carrier on which it is mounted, a photometric screen and a carrier on which it is mounted, and means for moving the screen carrier from the wedge carrier including a pin on the wedge carrier arranged to project out of the plane of its movement and a coöperating projection on the screen carrier arranged in the path of the pin.

15. In an instrument of the character described, a photometric wedge, a carrier on which it is mounted, a photometric screen and a carrier on which it is mounted, and means for intermittently and automatically moving the screen carrier from the continuous movement of the wedge carrier, comprising one or more projections on the screen carrier, a movable projection on the wedge carrier, adapted to engage the screen carrier projections, and means for automatically, intermittently promoting such engagement and disengagement.

16. In an instrument of the kind described, a casing, a carrier provided with a photometric wedge revoluble therein, a carrier provided with one or more observation screens also revoluble therein, and means for moving the screen carrier from the wedge carrier comprising a reciprocating pin on the wedge carrier and a cam carried by the casing by contact with which the pin is reciprocated and brought into and out of engagement with a coöperating member of the screen carrier.

17. In an instrument of the kind described, the combination with a movable photometric wedge, of an intermittently movable carrier provided with one or more photometric screens, a fixed scale and a movable scale, the latter graduated in terms of exposure times, the screen carrier being provided with time legends indicating the nature of the graduation sought to be read at any particular position of the movable scale.

18. In an instrument of the kind described, a casing provided with an annular cam, a shaft, a disk carrying a photometric wedge fixed on the shaft and rotating therewith, a disk carrying one or more observation screens loosely mounted on the shaft, and means for moving the screen disk from the wedge disk including projections on the screen disk, a pin carried by the wedge disk, a spring normally keeping it out of contact with such projections, the cam being so arranged that contact between it and the pin causes an engagement between the pin and one of such projections.

19. In an instrument of the kind described, a casing, a shaft, a disk carrying a photometric wedge rigidly mounted on the shaft, a second disk carrying one or more screens loosely mounted on the same shaft, and means for automatically intermittently coupling the two disks.

20. In an instrument of the kind described, a casing, a shaft, a disk carrying a photometric disk secured thereto and revolving therewith, a second disk carrying one or more screens and which disk is loosely mounted on the same shaft, and means for automatically intermittently coupling the two disks together, in combination with means for detaining the screen carrying disk while the photometric wedge is passing by a photometric screen.

21. In an instrument of the character described, a casing, a shaft, a photometric wedge carrier secured thereto, a photometric screen carrier loosely mounted on the same shaft, means for intermittently coupling the two carriers together in combination with means for detaining the screen carrier against rotation including notches on the periphery of such carrier and a coöperating detent adapted to engage the same and carried by the casing.

22. In an instrument of the character described, the combination with a rotatable photometric wedge member, of a rotatable screen member coöperating therewith, said members having a common axis of rotation, means for turning one member, and means for intermittently turning the other member from the first member.

23. In an instrument of the character described, the combination with a casing having a view opening therethrough, of rotatable wedge and screen members rotatably mounted in the casing on a common axis and movable across the view opening, a device carried by one member and arranged to periodically engage the other member to cause the intermittent movement of the latter from the former, and means in the casing for causing said periodic engagement.

24. In an instrument of the character described, the combination with a casing having a view opening therethrough, of rotatable wedge and screen members rotatably mounted in the casing on a common axis and movable across the view opening, a dog movably mounted transversely on one member and movable into and out of engagement with the other member to cause the intermittent movement of the latter, and a cam in the casing engaged by the dog upon the rotation of the member for causing said periodic engagement.

25. In an instrument of the character described, the combination with a casing having spaced walls and view openings through said walls, of rotatable photometric wedge and screen members mounted in the casing on a common axis, a transversely sliding pin mounted in one member and arranged to periodically engage the other to move the latter, and a cam carried by one of the walls and disposed in the path of the movement of the pin to cause its engagement with said other member.

In testimony whereof I affix my signature.

JOHN T. MacCURDY.